United States Patent
Soppe et al.

(10) Patent No.: US 6,547,948 B1
(45) Date of Patent: Apr. 15, 2003

(54) METHOD OF INCREASING THE CONCENTRATION OF DILUTE BRINE IN NACL ELECTROLYSIS PLANTS USING THE MEMBRANE PROCESS

(75) Inventors: Alfred Soppe, Issum (DE); Klaus Geisler, Bergisch Gladbach (DE); Bernd Bressel, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/677,970

(22) Filed: Oct. 3, 2000

(30) Foreign Application Priority Data

Oct. 8, 1999 (DE) .......................................... 199 48 588

(51) Int. Cl.⁷ ................................................. C25B 1/46
(52) U.S. Cl. ....................................... 205/516; 205/536
(58) Field of Search ................................... 205/516, 536

(56) References Cited

U.S. PATENT DOCUMENTS 541,146 A * 6/1895 Blackman ................... 205/516

OTHER PUBLICATIONS

W. Versteegen, report from Akzo Nobel, Mar. 26, 1990, J. H. G. van der Steegen, "Decomposition of Ironhexacyanides in Alkaline Brine of Chlorin–Caustic Plants During Dissolution and Brine Treatment".

Ullmann Encyclopadie der Technischen Chemie; Chapter Chlor und Natriumchlorid; Scouce, Chline, Reinhold Publishing Corp.; USA (month unavailable) 1962.

* cited by examiner

Primary Examiner—Arun S. Phasge
(74) Attorney, Agent, or Firm—Norris McLaughlin & Marcus

(57) ABSTRACT

The present invention relates to a method of increasing the concentration of dilute brine in NaCl electrolysis plants using the membrane process, wherein the NaCl required is stored in a mass flow silo with supernatant liquid and is fed continuously from there to the quick dissolver.

6 Claims, No Drawings

METHOD OF INCREASING THE CONCENTRATION OF DILUTE BRINE IN NACL ELECTROLYSIS PLANTS USING THE MEMBRANE PROCESS

In the production of chlorine and sodium hydroxide by the membrane process, virtually saturated NaCl solution (brine) is fed to the electrolysis cell. There, the desired products chlorine, sodium hydroxide and hydrogen are produced by means of direct current. The salt concentration in the brine is at the same time reduced by 80–130 g/l. In addition, the amount of brine present in the electrolysis cell is decreased during the electrolysis process by 3–4 mol of $H_2O$ per mole of NaOH produced.

In order to maintain the electrolysis process, these cells have to be continually supplied with sufficient concentrated brine for the salt concentration in the dilute brine (anolyte) leaving the cell not to drop below the minimum concentration specified by the membrane manufacturer. This is about 170 g of NaCl per litre. The depletion of the brine is usually restricted to from 200 to 220 g of NaCl per litre.

Thus, about 40% of the amount of salt introduced with the brine into the electrolysis cell is utilized. The dilute brine leaving the cell is recycled for economic and ecological reasons, i.e. after dechlorination, its concentration is increased again by means of solid salt and after appropriate purification it is fed back to the electrolysis cell. Before addition of crystalline salt to increase the concentration, the missing am amount of water is added to make up for the amount of liquid escaping through the membrane.

In conventional plants to increase the concentration of brine, the brine is customarily passed from the bottom upward through containers (quick dissolvers) containing crystalline salt. In this way, the concentration of the brine is increased. The salt is continuously introduced into the quick dissolver by means of mechanical feed devices. In an alternative method, the dilute brine is introduced into open salt storages and its concentration is increased there (Ullmann Encyclopädie der technischen Chemie; Chapter Chlor und Natriumchlorid; Scouce, Chlorine, Reinhold Publishing Corp.; USA; 1962).

In such plants, salt is taken from an appropriate dry salt storage either using automatic conveyor units or by means of bucket-wheel loaders.

The methods known from the prior art suffer from a series of disadvantages.

If possible, the quick dissolver is supplied directly, without intermediate storage, from the salt transport path. However, the salt used here has to be doped with anticaking agents (e.g. potassium hexacyanoferrate) to enable it to be stored, which leads to a poorer current yield in the electrolysis process (cf. W. Versteegen, report from Akzo Nobel, title: Decomposition of Ironhexacyanides in alkaline Brine of Chlorin-Caustic Plants during dissolution and Brine treatment, Author: J. H. G. van der Steegen, Mar. 26, 1990).

Open dissolution pits lead to formation of salt-containing mists, which in turn causes considerable corrosion damage to surrounding installations. In addition, an unnecessarily large amount of heat is lost as a result of the escape of steam and this has to be replaced afterwards by heating.

In addition, mechanical feed devices for supplying quick dissolvers are subject to continual wear, have a high maintenance requirement and need corresponding labour-intensive supervision and attention.

It is an object of the present invention to provide a method of increasing the concentration of dilute brine, which avoids the abovementioned disadvantages and:

automatically increases the concentration of the dilute brine from a storage (silo), does without addition of anticaking agents to enable the salt to be stored, has low heat losses, keeps large amounts of salt at the ready, does without mechanical transport devices.

However, dry or almost dry NaCl having a residual moisture content of 1–3% is not able to be stored in a silo: it tends to suffer from bridge formation and caking and makes reliable metering impossible.

It has surprisingly been found that NaCl without addition of anticaking agents can be stored in a silo and metered without problems from there if the NaCl is admixed with water in such a way that some supernatant liquid is always ensured. The height of liquid above the salt varies depending on the silo size and its geometric configuration. It should be selected so that the salt does not become dry. If necessary, water has to be added during the dispensing procedure.

The present invention accordingly provides a method of increasing the concentration of dilute brine in NaCl electrolysis plants using the membrane process, which is characterized in that the salt is stored in a mass flow silo with supernatant liquid and is fed continuously from there to the quick dissolver or preferably directly to the dilute brine stream.

According to the present invention, the salt is stored in the silo in such a way that the salt bed is covered with saturated brine or water. Since the height of liquid above the salt bed is reduced when water/NaCl mixture is taken out, additional water has to be introduced so as to ensure that a minimum height of liquid above the salt of 20 cm is maintained.

The supernatant brine is used to suppress bridge formation and to flush the crystalline salt from the outlet pipe of the silo. Relatively small amounts of liquid are sufficient to discharge the salt.

The dimensions of the silo need to be such that the filter resistance caused by the salt produces a liquid flow which is able to dispense the desired amount of salt. Preferred silos are mass flow silos. In general, silos of this type have the following dimensions: diameter: 5 to 12 m, height: 10 to 25 m.

The amount of liquid seeping through the contents of the silo can be checked and its order of magnitude estimated on the assumption of a stationary solid in the silo, e.g. with the aid of known calculation procedures, e.g. for groundwater flow.

The mathematical calculation shows that in a customary mass flow silo, sufficient seepage liquid to discharge the amount of salt required in a membrane electrolysis is available even in the case of finely divided salt.

On the other hand, experiments show that the proportion of liquid in the discharge is smaller than the amount of additional water required in the brine circuit. This proves to be advantageous for the NaCl membrane process, since it allows the amount of water added to be controlled as required.

EXAMPLE 20 t of crystallized salt without any caking agent are placed in a 20 $m^3$ container having a conical bottom and outlet pipe and covered with deionized water until the height of the supernatant water layer is about 20 cm.

From outlet pipes, a salt brine having a concentration of about 250 g/l is conveyed past and pumped by means of a pump via a flow measurement and a radiometric density measurement to the next process step (brine filtration).

The radiometric density measurement is employed to control a regulating valve which meters sufficient salt slurry into the brine stream to give a virtually saturated brine having a density of 1.198 g/m$^3$.

After the amount of dilute brine whose concentration is to be increased is halved, the abovementioned value of 1.198 g/m$^3$ is restored after about 90 seconds.

If the pump power is increased again, the prescribed density value has been reestablished within 60 seconds.

At a mean brine flow of about 2.1 m$^3$/h, the salt has been completely dispensed from the silo after 83 hours, while the supernatant liquid still covers a third of the height of the outlet cone.

What is claimed is:

1. Method of increasing the concentration of dilute brine in NaCl electrolysis plants using the membrane process, wherein the NaCl required is stored in a mass flow silo as solid crystals beneath the surface of a liquid and is conveyed as a flow of crystals to a quick dissolver.

2. The method of claim 1, wherein said liquid is water, and said flow of crystals is in the form of a slurry.

3. Method according to claim 1, wherein the salt is fed to the silo using mechanical transport devices.

4. Method according to claim 1, wherein the salt is introduced into the silo by means of hydraulic transport.

5. A method of increasing the concentration of dilute brine in NaCl electrolysis plants using the membrane process, wherein the required NaCl is stored in a mass flow silo as solid crystals beneath the surface of a liquid, and is conveyed from said mass flow silo directly into a dilute brine stream as a flow of crystals.

6. The method of claim 5, wherein said liquid is water, and said flow of crystals is in the form of a slurry.

* * * * *